Nov. 2, 1971     D. KLOCKNER, JR     3,616,505

PAINT AND SCALE REMOVING APPARATUS

Filed Feb. 16, 1970     2 Sheets-Sheet 1

INVENTOR.
DANIEL KLOCKNER JR
BY
*Ralph K. Roberts*
AGENT

INVENTOR.
DANIEL KLOCKNER JR.
BY
AGENT

United States Patent Office 3,616,505
Patented Nov. 2, 1971

3,616,505
PAINT AND SCALE REMOVING APPARATUS
Daniel Klockner, Jr., 294 Boulevard,
Mountain Lakes, N.J. 07046
Filed Feb. 16, 1970, Ser. No. 11,429
Int. Cl. B21c 43/00
U.S. Cl. 29—81                                11 Claims

ABSTRACT OF THE DISCLOSURE

A brush machine includes a grouping of adjustably positioned brushes carried on a shaft mounted on a frame adapted for hand manipulation and operator propulsion. The brushes are rotatably driven in the frame which is pivotally supported so that the brushes may be brought into localized engagement with the top of a structural beam so as to remove at selected positions and spacing the scale, dirt and paint on top of the beam. The cleaned surface is thus in condition for the welding of studs to the top of the beam.

DESCRIPTION OF THE PRIOR ART

In the technique of concrete slab and steel beam composite construction as is now generally used in a large number of highway overpass and bridge constructions and is also used in the forming of floors and ceilings of multi-floor buildings it is highly desirable to increase the bond between the concrete of the slab and the flange of the steel beams. This is accomplished by the providing on the steel beams of protrusions which are engaged by the poured concrete to make the resulting product a composite structure. For bridges in particular the live load is usually of a short duration and the design thereof requires that the stress be carried by a shear connection provided by studs or the like which are welded or otherwise attached to the steel beams. For example, with many designs using large girders, it is known to attach as by welding, seven-eighths inch diameter studs to the top of the girders in an array of three or four studs to a row with a series of rows spaced from at distances of less than a foot to distances of more than two feet. The approved design requires that each of these studs are generally attached to the girders by means of stud welding machines using fifteen hundred to eighteen hundred amps welding current. With such a high amperage the cycle or welding time is of a short duration and it is essential that the contact surfaces between the girder beam and the end of the stud be clean so that the weld is not brittle and that the load applied to the stud may be forcefully accepted by the beam.

Insofar as is known, no apparatus for the ready removal of dirt, scale, rust and paint commonly found on these girders is currently available whereby the top surface of the girder or beam may be locally cleaned at those particular areas whereby the studs are to be welded. In the course of a day several hundred studs may be required to be driven at one installation the hand removal by means of a hand grinder at each of the stud locations is a slow and laborious process. In the present invention there is provided means whereby one man may readily provide an exceptionally clean surface at localized points along the beam and at selected positions and at desired spacings so that the studs may be precisely positioned and effectively welded to the beams in an accepted manner.

SUMMARY OF THE INVENTION

The present invention may be summarized at least in part with reference to its objects.

It is an object of the present invention to provide, and it does provide, a paint and scale removing apparatus wherein a plurality of rotatably driven brushes may be moved to selected positions on a structural beams whereat the brushes are brought into localized engagement with the top of the beam so as to clean the beam at these localized spots.

It is another object of the present invention to provide and it does provide, a scale and paint removing brush machine whereby brushes adjustably positioned upon a shaft and driven by motor means contained therewith is readily movable upon the top of a beam to locally clean the top of said beam by means of wire brushing at selected intervals and positions.

It is a further object of the present invention to provide, and it does provide, a paint and scale removing apparatus wherein a plurality of wire brushes are adjustably spaced on a rotatable shaft driven at a selected speed, the rotatable shaft is carried on a support frame pivotally carried on a pair of wheels so that the brushes may be moved toward and away from the top surface of a structural beam to locally engage and clean the upper beam surface at localized portions to permit the welding of studs to the beam.

It is another object of the present invention to provide, and it does provide, a scale and paint removing brush machine wherein a plurality of wire brushes of like size is adjustably positioned and driven by a single shaft which shaft is rotated by means of a motor carried by the apparatus. Said apparatus is carried by a pair of wheels of comparatively large diameter by which the machine is balanced and may be moved thereon. This apparatus further has at one end of its frame a smaller wheel adapted to limit the tilt of the machine in one direction whereby when the small wheel is in engagement with the beam the brushes are above a normal line of contact with the beam and when the machine is tilted in the other direction the brushes are brought into contact with the top of the beam. A handle means is provided on the frame of the machine so that the machine may be readily propelled by the operator and may be readily tilted around the main supporting wheels of the apparatus.

The brush machine of this invention in its preferred embodiment has three or more wire brushes of like size and diameter which are adjustably mounted on a shaft rotatably mounted on a shaft rotatably carried by a generally rectangular frame. A pair of wheels in generally parallel alignment with the brush shaft are sized and positioned to support the frame while permitting the frame to pivot or rock forward and back on the wheels so that the brushes may be moved into and from engagement with the top surface of a structural beam. A motor such as a gasoline motor is carried by the frame and by a belt or chain drives the brushes at a selected speed. A handle on one end of the frame permits the operator to push and tip the frame while on the other end a smaller single wheel provides a forward limit to the rocking of the frame while permitting rolling movement of the cleaning machine.

INTENT OF THE DISCLOSURE

Although the following disclosure offered for public dissemination is detailed to insure adequacy and aid in understanding of the invention, this is not intended to prejudice that purpose of a patent which is to cover the inventive concept therein no matter how it may later be disguised by variations in form or additions of further improvements. The claims at the end hereof are intended as the chief aid toward this purpose, as it is these that meet the requirement of pointing out the parts, improvements or combinations in which the inventive concepts are found.

There has been chosen a specific embodiment of the paint and scale removing apparatus and showing a preferred means for localized cleaning of the top surface of a structural beam and the like. This specific embodiment has been chosen for the purposes of illustration and description as shown in the accompanying drawing wherein:

BRIEF DESCRIPTION OF THE DRAWINGS

In the following description and in the claims various details will be identified by specific names for convenience, these names, however, are intended to be generic in their application. Corresponding reference characters refer to like members throughout the several figures of the drawings.

Figure 2:
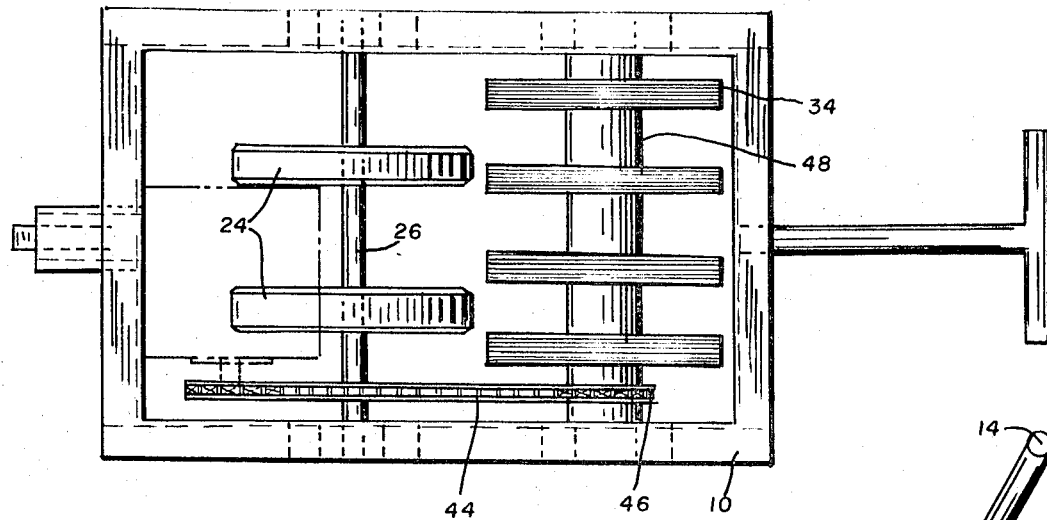
FIG. 2 represents a plan view of the brush cleaning apparatus shown in FIG. 1.

The drawings accompanying, and forming part of, this specification disclose certain details of construction for the purpose of explanation of the broader aspects of the invention, but it should be understood that these structural details may be modified in various respects without departure from the concept and principles of the invention.

DESCRIPTION OF THE PREFERRED EMBODIMENT

Referring now in particular to the paint and scale removing brush machine as shown in the drawings wherein a preferred embodiment includes a frame 10 which may be a welded channel frame of a generally rectangular construction. Extending upwardly at an angle from one end of this frame is a handle 12 having a hand gripping end 14 attached to the upper end. At and on the other end of this frame 10 there is provided a small wheel 16 rotatably carried by a bracket 18. This small wheel 16 is positioned generally midway of this one end and is aligned with the axis of the wheel generally at right angles to the sides of the frame.

Carried on the upper portion of this frame 10 is a motor 22 which may be a gasoline or an electric motor depending upon the characteristics and operating necessity for the several jobs for which this machine is to be used. When the machine is to be completely portable and there is no local availability of electricity or pneumatic pressure then it is generally desirable that the motor 22 be a gasoline motor of a type commonly available and of inexpensive cost. Upon the lower side of this frame and at a point about forty percent from the end of the frame is mounted a pair of larger wheels 24 which may be about eight inches in diameter. These wheels are carried by a shaft 26 in bearing blocks 28 attached to the underside of the frame. Also carried in bearings in a pair of pillow blocks 30 attached to the frame 10 is a shaft 32 which shaft is a determined distance from the handle end of the frame 10 and carries thereon a plurality of wire brushes 34. These wire brushes are carried in hubs slidably keyed on the shaft 32 so that as the shaft 32 is rotated the brushes are likewise positively rotated.

Figure 1:
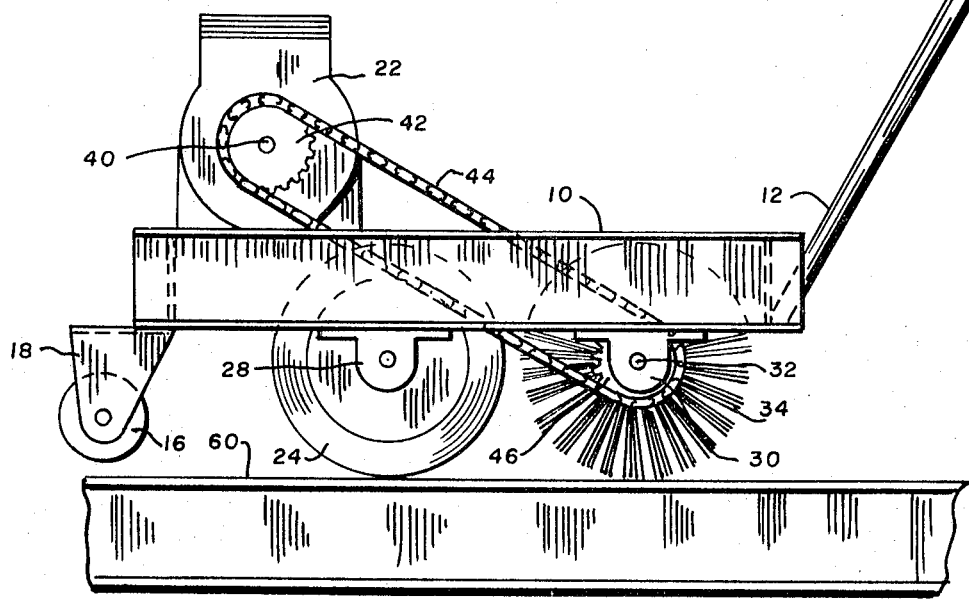
FIG. 1 represents a side view of a preferred embodiment of the apparatus of this invention and showing the machine with the brushes in position to engage the top surface of a structural beam.

Carried by and on a shaft 40 of the motor 22 is a sprocket 42 which carries and drives a roller chain 44. As this roller chain is driven it engages and drives a sprocket 46 keyed to and carried by brush shaft 32. In the preferred embodiment there is carried on this brush shaft a plurality of spacers 48 which are removable from the shaft 32 after it is removed from the frame. This may be accomplished by removing one of the pulley blocks 30 from one end of the shaft. These spacers 48 are of a determined length so that when mounted between adjacent brushes 34 the brushes are selectively spaced along the shaft 32. The number of brushes 34 mounted on the shaft is a matter of determination and is generally at least three brushes and may be as many as five. The number of brushes mounted on the shaft corresponds to the number of studs to be welded to the top of a particular beam. The chain 44 is shown in the present illustration as being mounted absent a guard however for safety sake a guard is preferably provided. As the motor 22 is actuated, the roller chain 44 drives the shaft 32 by means of sprocket 46 so as to cause the brushes 34 to rotate at a determined speed. The direction of rotation of the brushes is merely a matter of selection since the operator controls the degree of engagement of the brushes with the top of the structural beam by manipulation of the handle 12 and 14. In the embodiment of FIG. 1 with the brushes being rotated in a counterclockwise manner the apparatus will be urged forwardly when the brushes are brought into engagement with the top of a beam 60.

Figure 4:
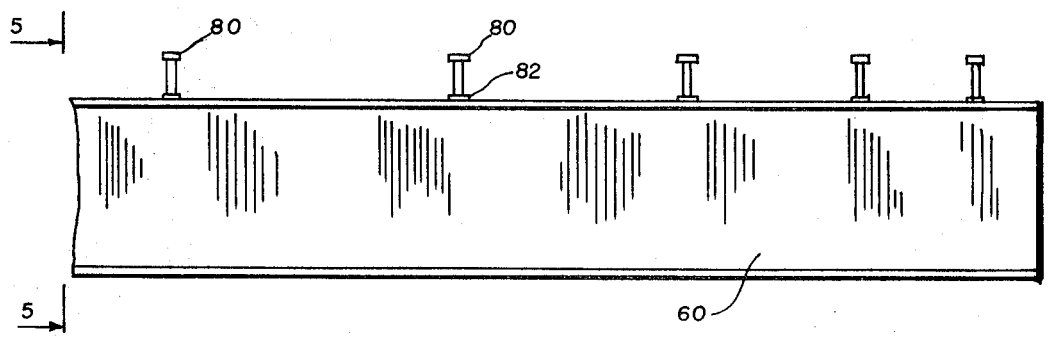
FIG. 4 represents a side view of the beam of FIG. 3 with a series of studs welded in place.
Figure 5:
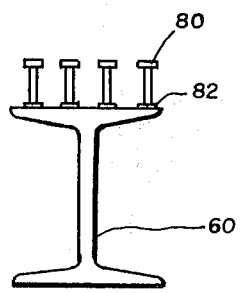
FIG. 5 represents an end view of the structural beam with the studs as welded in place this view being taken on the line 5—5 of FIG. 4.
Figure 3:
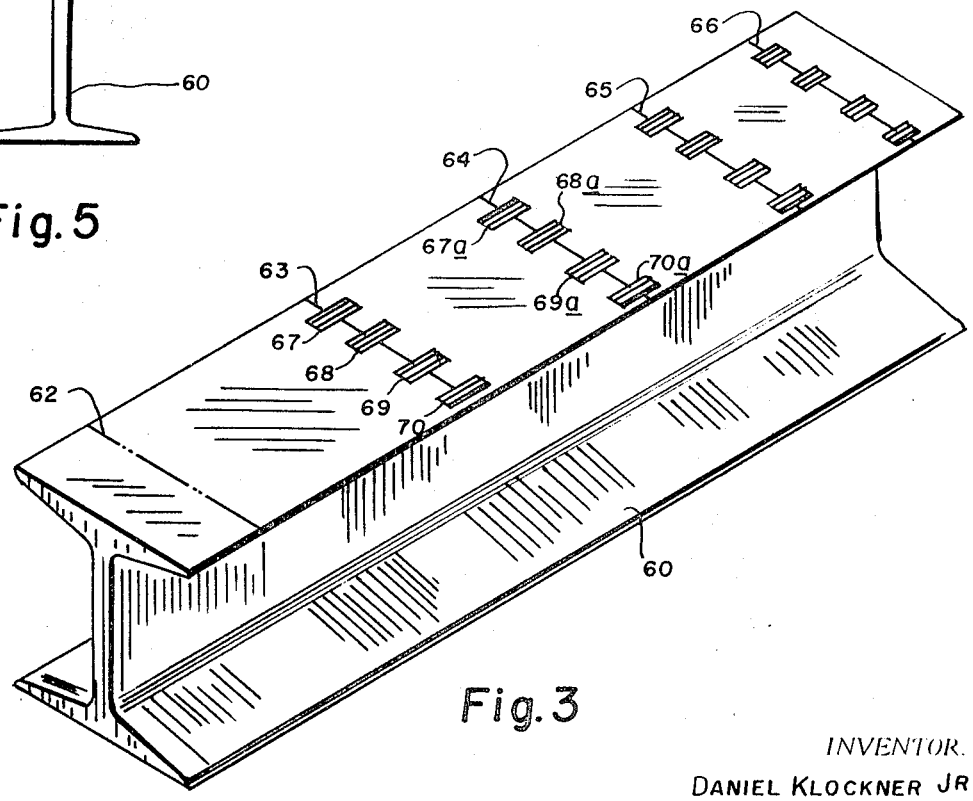
FIG. 3 represents a fragmentary isometric view of a structural I-beam whereon localized portions of the top surface of said I-beam have been wire brushed to condition the beam for the welding thereto of studs of determined size and length.

Referring now to FIGS. 3, 4 and 5 it is to be noted that in FIG. 3 a beam 60 is shown as having its top surface conditioned to receive a selected spacing of studs. From previously supplied information such as a blueprint the desired spacing is indicated on the top of the beam by drawing a series of lines in accordance with the prescribed information. Such lines are indicated on FIG. 3 as lines 62, 63, 64, 65 and 66. The side-by-side spacing of the studs upon the top surface of the beam 60 is also determined by supplied information and are a determined distance from the edge of the beam. The brushes 34 are spaced on the shaft 32 by using a series of selected spacers 48 after which the operator brings the brush cleaning machine to the beam. After starting the motor to cause the brushes to rotate at a determined speed, the operator brings the brushes to a position just above one of the lines indicated as 62 through 66. The operator then tilts the machine on wheels 24 to cause the brushes to be pressed downwardly upon the beam causing cleaned spots 67 through 70 to be provided on the top surface of the beam 60. After making a desired array of cleaned spots 67 on one of the lines 62 through 66 the operator moves to the next line and repeats the procedure to again provide an array of cleaned spots identified as 67a, 68a, 69a and 70a as indicated on line 64. The process is repeated for the remaining lines inscribed on top of the beam. Not shown on the embodiment of FIGS. 1 and 2 is a side guide by which the machine is aligned with one edge of the beam. This side guide may be merely a bar attached to one side of the machine or may be a bar adjustably mounted on the front end of the machine which bar is slidable along the channel to provide for the operator a sight guide to align the machine in relation to one edge of the beam. This guide is merely a matter of selection and other guiding devices such as a flanged wheel may be readily provided.

Referring now to FIGS. 4 and 5 it is to be noted that after the surface of the beam has been locally cleaned a multiplicity of studs 80 of like size are stud welded to the top of the beam 60 by means of welding equipment conventionally known in the trade. This welding equipment often uses amperage in the neighborhood of fifteen hundred to eighteen hundred amps. for the welding of each stud to a beam. Usually three to four rows of studs are applied at each line which is transverse to the beam and at selected spacings along the beam. The stud welding technique is generally preferred and provides means for a composite beam construction which is an improvement of the concrete-slab-on-beam type of construction. This composite beam construction uses studs which may be those identified as "Nelson" studs with Nelson being a registered trademark for shear connector studs as manufactured by the Nelson Stud Welding Division of Gregory Industries, Inc., of Loraine, Ohio. These or like manufactured studs may be seven-eighths of an inch in shank diameter and may be of any selected length from one-and-a-half to five inches in length depending upon the design requirements of the structure being built. Also indicated in FIGS. 4 and 5 are ferrules 82 which are used on the shank of the stud when stud welding to a metal surface so that the weld may be protected from corrosion and attack when the concrete is poured around the stud.

USE AND OPERATION

Referring in particular to FIGS. 1, 2 and 3 it is to be noted that with the apparatus of FIG. 1 placed upon the top of beam 60 the operator causes motor 22 to be actuated or started and, after reaching a determined speed so that the brushes 34 are turning at a selected speed as for example fifteen hundred to two thousand revolutions per minute, the operator moves the equipment to bring the brushes 34 over one of the marks as for example 62. The frame is then tilted so that the low point of the rotating brushes are brought lightly into engagement with top surface of the beam. The operator then moves the cleaning machine two or three inches back and forth along the beam so that cleaned spots are provided by the action of the wire brushes at points 67, 68, 69 and 70. The wire brushing causes all of the paint scale and the like to be locally removed from the top of the beam until these spots on the top of the beam are in a "bright-metal" condition whereupon the operator manipulates the machine to tip the machine forward until it pushes the machine to the next position or station whereat the brushes 34 are just above the next line drawn upon the top of the beam whereupon the operator causes the apparatus to be tilted backwards toward the operator to bring the brushes 34 upon the beam at this new location whereupon the cleaning operation is repeated.

In practice the cleaning operation actually requires only a few seconds, as for example a half a minute, for the operator to complete one transverse lot of cleaned spots. In addition to maintaining the tilted condition of the apparatus there is also the short back-and-forth movement of only a very few strokes whereupon the beam is cleaned at the spot locations and the operator may move on. A beam having sixty to eighty studs or more to be welded thereto may be cleaned in as few as four or five minutes after which the operator moves to another beam to again repeat the operation. This continues for as many beams as is required. The effectiveness of the above described cleaning method in removing the scale and paint from the top of beams 60 is evidenced by the successful use of an actual reduction to practice apparatus which has been used to clean beams at several installations. This apparatus has rapidly cleaned several thousand beams and to these cleaned beams at least a quarter of a million or more studs have been stud welded. The quality of the welds made by welding studs to machine-prepared surfaces has resulted in a rejection rate substantially less than the rejection rate for studs welded to beams prepared by hand grinding. The hand grinding of prepared surfaces in addition to requiring from fifteen to twenty times as much labor to produce the cleaned surface generally has resulted in as many as twice the number of rejects.

The advantage of such a machine and its simplicity of operation is thus readily apparent. The cleaning machine is substantially balanced over the two wheels 24 and requires little operator effort to tilt to a cleaning operating condition or to tilt to a rolling condition. In practice the wheels 24 are positioned on the frame so that the weight of the motor causes the machine to tend to tilt forward to rest upon the two wheels 24 and the small wheel 16. In this condition the motor may be allowed to run at idle speed with the brushes rotating in a non-engaged attitude. The machine as it rests on the three wheels may also be pushed with little effort resulting in very little fatigue by the operator in the moving of the machine to new cleaning locations. The machine rests on the three wheels until the operator desires to bring the rotating brushes into a cleaning engagement with the beam whereupon the operator pulls the handle 14 toward him and pushes down to bring the brushes into engagement with the top of the beam. The operator then pushes and pulls the machine forward-and-back for determined distances until the desired length of cleaned spot is provided at the previously marked lines as for example 62 through 66. The wearing rate of each brush is substantially the same as all brushes are contemplated as being brought into engagement with the beam at the same time resulting in a generally equalized wear rate. The brushes are permitted to wear down until they reach a diameter which is too small to provide a substantial area of contact and an efficient cleaning action upon the beam. As the cost of wire brushes is quite modest the use and frequent replacement of wire brushes is anticipated. In the actual reduction to practice, wire brushes have provided a most effective way for producing a desired cleaning of structural beams, however sanding discs or sanding belts may be substituted since these would also produce a desired cleaning action. When a grinding action is desired or required on the top surface of the beams it is contemplated that a sanding action could be provided in a machine of this character.

Terms such as "left," "right," "up," "down," "bottom," "top," "front," "back," "in," "out," "clockwise," "counter-clockwise" and the like are applicable to the embodiment shown and described in conjunction with the drawings. These terms are merely for the purposes of description and do not necessarily apply to the position in which the brush cleaning machine may be constructed or used.

The conception of this cleaning machine and its many applications is not limited to the specific embodiment shown but departures therefrom may be made without sacrificing its chief advantages and protection is sought to the broadest extent the prior art allows.

What is claimed is:

1. Cleaning apparatus for removing dirt, paint, scale and the like simultaneously from localized areas on the surface of structural beams and the like, said cleaned areas arranged in a preselected spacing and aligned array, said cleaning apparatus including: (a) a frame; (b) a pair of wheels disposed to pivotally support the frame so that the frame may be rocked on the wheels by an operator of the apparatus to angularly displace the frame from a generally horizontal condition; (c) a handle provided on the frame and disposed so that the operator may grasp the handle so as to manipulate and selectively tilt the frame; (d) a shaft rotatably carried by the frame, said shaft disposed to removably retain thereon a plurality of selectively spaced rotary brushes of like diameter with each of the brushes having a lower portion thereof disposed to extend a determined distance below the frame, said shaft being mounted on the frame in a determined relationship to the placement of the wheels so that the frame when tilted to a first direction and condition on the wheels permits the lower exposed portion of the selectively spaced brushes to be brought into engagement with the surface to be cleaned; (e) motor means having its output connected to the rotatable shaft carrying the abrading means so as to rotate said shaft at a selected speed, and (f) means for limiting the tilt of the frame in a second direction which direction is opposite the first direction and with the frame tilted to the second limit the lower extent of the brushes are brought to a condition in space which is a selected distance above the support surface upon which the wheels rest.

2. Cleaning apparatus as in claim 1 in which the means for limiting the forward tilt of the frame is a rotatable wheel carried by the frame to provide a three wheel support arrangement disposed to permit easy moving of the apparatus over the support surface.

3. Cleaning apparatus as in claim 2 in which the handle means is a member attached to the frame at an end which is opposite the end carrying the forward rotatable wheel.

4. Cleaning apparatus as in claim 1 in which the wheels pivotally supporting the frame are mounted so that the plane of rotation of each of the wheels is substantially parallel to the side of the frame and in which the means for limiting the tilt of the frame is at least one other wheel carried on the forward portion of the frame to provide at least a three wheel support arrangement disposed to permit easy moving of the apparatus over the support surface.

5. Cleaning apparatus as in claim 4 in which the brushes are of wire, said wire brushes also being adjustably mounted along the rotatable shaft to provide selectable determined side-by-side spacing of the areas to be cleaned.

6. Cleaning apparatus as in claim 5 in which the motor means is mounted on the frame at a position intermediate the axis of the pair of wheels providing the pivotal support and the axis of the wheel providing the limit to the forward tilt, the placement and weight of the motor being such that in a released and at-rest condition the center of gravity of the apparatus will be such as to cause the apparatus to rest on the wheels with the wire brushes free of engagement of the surface to be cleaned.

7. Cleaning apparatus as in claim 6 in which the shaft carrying the wire brushes has its axis in a plane substantially parallel to the axis of the wheels providing the pivotal support, said shaft carrying the wire brushes being further positioned on the frame and from the axis of the wheels so as to be disposed on the side of the frame opposite the positioning of the motor.

8. Cleaning apparatus as in claim 7 in which the handle means includes a member attached to the end of the frame which also carries the wire brushes.

9. Cleaning apparatus as in claim 5 in which the means for spacing the brushes along the rotatable shaft are spacers of determined length.

10. Cleaning apparatus as in claim 5 in which the motor means is a gasoline engine disposed to be self-contained on the apparatus to provide a generally unlimited range of operation.

11. Cleaning apparatus as in claim 10 in which the driving connection from the motor to the shaft carrying the brushes includes a driver and driven V-belt pulley and V-belt operatively connecting the two pulleys.

References Cited

UNITED STATES PATENTS

| | | | |
|---|---|---|---|
| 971,443 | 9/1910 | Hall | 51—176 |
| 1,640,933 | 8/1927 | Gries | 51—176 |
| 2,179,963 | 11/1939 | Spadone | 15—77 |
| 2,525,250 | 10/1950 | Westphal | 29—81 L |
| 2,736,544 | 2/1956 | Wright | 51—176 UX |
| 2,767,413 | 10/1956 | Herrington | 15—77 |
| 3,357,745 | 12/1967 | Cooper | 51—176 X |

ALFRED R. GUEST, Primary Examiner

U.S. Cl. X.R.

15—77